United States Patent [19]
Bowlin et al.

[11] Patent Number: 5,479,439
[45] Date of Patent: Dec. 26, 1995

[54] ANALOG SERVICE CHANNEL PORT FOR DIGITAL INTERFACE

[75] Inventors: Robert E. Bowlin, Huntsville; Lonnie McMillian, Madison, both of Ala.

[73] Assignee: Adtran, Huntsville, Ala.

[21] Appl. No.: 686,415

[22] Filed: Apr. 16, 1991

[51] Int. Cl.[6] .................................. H04B 14/04
[52] U.S. Cl. ..................... 375/242; 370/110.1; 370/6; 455/67.7
[58] Field of Search ............ 375/25, 5; 370/110.1, 370/110.2, 6; 455/58.2, 67.2

[56] References Cited

U.S. PATENT DOCUMENTS

| | | | |
|---|---|---|---|
| 4,346,476 | 8/1982 | Yamasawa et al. | 375/25 X |
| 4,437,087 | 3/1984 | Petr | 375/5 X |
| 4,581,746 | 4/1986 | Arnold | 375/5 X |
| 4,677,644 | 6/1987 | Lacroix et al. | 375/5 |
| 4,812,815 | 3/1989 | Miyakoshi et al. | 375/25 X |
| 5,144,675 | 9/1992 | Cain et al. | 370/110.1 |

Primary Examiner—Stephen Chin
Assistant Examiner—Bryan Webster
Attorney, Agent, or Firm—Charles E. Wands

[57] ABSTRACT

An office channel unit data port is modified to incorporate a test tone detector and modified control software, to provide an analog service channel port that is capable of responding to analog test tones sourced from an analog tone-based test service facility, in order to test local and remote communication channels and analog/digital interface equipment. In addition, operation control codes have prescribed function-representative values that do not introduce disturbing 'glitches' onto the analog line; instead when converted into analog format they produce respective voltages that effectively correspond to voltage levels expected to be seen by an analog channel, while conforming with the accepted practice of permitting a zero to be used in the LSB position for control code purposes.

15 Claims, 15 Drawing Sheets

NEAR END LOCAL
LOOP TESTING

FAR END REMOTE
LOOP TESTING

NOTES:

1. TONE "A" = 634 HZ, "B" = 484 HZ, "C" = 434 HZ, "D" = 564 HZ

2. ACP LOOPBACK SEQUENCE
   a) TONE "A"
   b) UPSTREAM MAPPED UMC CODES (OPTIONAL - CAUSED BY DTDM'S)
   c) TONE "B"
   d) TONE "D"

3. CHANNEL LOOPBACK SEQUENCE
   a) TONE "A"
   b) UPSTREAM MAPPED UMC CODES (OPTIONAL - CAUSED BY DTDM'S)
   c) TONE "B"
   d) TONE "C"
   e) TONE "B"
   f) TONE "D"

ANALOG SERVICE CHANNEL PORT FOR DIGITAL INTERFACE

FIELD OF THE INVENTION

The present invention relates in general to telephone communication systems and is particularly directed to an office channel unit-resident apparatus for testing local and remote communication channels and analog/digital interface equipment through which an analog modem located at a customer premise is interfaced with an inter-station digital communication network.

BACKGROUND OF THE INVENTION

U.S. patent application Ser. No. 455,161, filed Dec. 22, 1989, now U.S. Pat. No. 5,040,190 entitled "Analog Data Station Terminal" by M. Smith et al, assigned to the assignee of the present application and the disclosure of which is herein incorporated, describes an analog/digital interface device through which the digital signalling capability of a digital carrier telephone communication system can be extended all the way to the customer site, thereby eliminating a number of impairments normally encountered on local loops, including the need for equalization of analog lines. As described in the Smith et al application, such an analog/digital interface device, termed an analog data station terminal, has an analog channel port which interfaces directly with an analog channel from the customer, on the one hand, and a digital port which interfaces with a 56 Kb secondary channel mode, unloaded four wire digital pair from a central office (digital) channel unit data port, on the other hand.

The central office channel unit (OCU) data port is essentially a 64 Kb clear channel digital-to-digital interface commonly employed in digital communications systems to transport digital data between stations, via a prescribed digital carrier (e.g. a T1 or 1.544 Mb/s channel). As such, it is not capable of accepting analog tone signals conventionally employed by a telephone test facility to conduct diagnostic testing of the channel. Thus, although the analog data station terminal solves the problem of analog line conditioning, and thereby enables the telephone company to extend digital communications all the way to the customer premise, there still remains the problem of interfacing an analog tone-based test facility with signal format-incompatible digital signalling units. Also, a clear channel unit is not capable of performing zero suppression.

An additional shortcoming of a conventional OCU data port is the unwanted perturbation of an analog channel that results from converting a digital code byte used to execute prescribed control functions into analog format. Specifically, such code bytes are intended to be decoded by another OCU data port rather than being converted into an analog voltage for application to an analog channel. However, if the office channel unit is also ported to an analog/digital interface, such as the above-mentioned analog data station terminal, the analog-to-digital conversion of the control function codes will produce analog voltage levels which are substantially different from signal levels expected to be seen by downstream analog equipment, resulting in 'glitch' on the analog channel.

SUMMARY OF THE INVENTION

In accordance with the present invention, the above-mentioned problems of a conventional OCU data port are obviated by a two-fold modification of the data port, making the data port capable of accepting analog tone test signalling from a standard analog test facility, and through the use of a prescribed set of control function-defining digital code bytes which, when converted into analog format, as by of an analog data station at the customer premise, produce voltage levels that effectively correspond to the analog signal levels expected to be seen by an analog channel for respective ones of such control functions.

More particularly, pursuant to a first aspect of the present invention, an OCU data port is modified to produce what will be termed an analog service channel port. The analog channel port of the present invention includes a voice band tone detector which is coupled to the output of the (bipolar) receiver unit within the data port. This tone detector serves to detect the application of diagnostic test tone signals (e.g. loopback test command tones) to the four wire link that interconnects the data port with associated analog/digital equipment, such as an analog data station terminal. The control software embodied within the modified office channel unit data port's micro-controller is augmented to respond to such test tone signals and to carry out prescribed (loopback) tests of a communication channel which contains the four wire link, via a series of synthesized tone signals associated with the diagnostic request from the attendant test facility.

In accordance with a first, near end-originated, local loop test mode, a near end test is initiated by a near end test request tone (e.g. a 1004 Hz tone) supplied from the servicing test facility to the analog service channel port by way the four wire local loop to the analog data station terminal. After a prescribed time out period, the micro-controller within the analog service channel port responds with an acknowledgement tone (e.g. 2400 Hz), whereupon the test facility removes the test tone request from the loop. The micro-controller then proceeds to conduct a prescribed series of loopback tests along the local loop up to and including the analog channel side of the analog data station terminal. Depending upon the results of these tests, a unique one of a plurality of different test result tone signals is synthesized by the micro-controller and supplied back to the test facility in response to a test results retrieval tone (e.g. a second 1004 Hz tone). The respective frequencies of the test result tone signals include a tone whose frequency indicates that all loopback tests have been passed and, if not, the frequency of the tone identifies the location of a test failure.

In accordance with a second, near end-originated, remote loop test mode, a far end loop test request tone (e.g. a 1504 Hz tone) is supplied from the servicing test facility to the analog service channel port by way the four wire local loop. The analog service channel port responds by determining whether the remote station contains an analog channel service port. If the remote station contains another analog channel port, then, as in the first test mode, the micro-controller then proceeds to conduct a series of loopback tests along the remote loop through the analog channel side of the remote analog data station terminal. Again, depending upon the results of these tests, a unique one of a plurality of different test result tone signals is synthesized by the micro-controller and supplied back to the test facility in response to a test results retrieval tone.

If the remote station has been determined not to contain an analog channel port, then, in accordance with a third near end-originated, analog tone swap test mode, the micro-controller synthesizes a 1014 Hz tone at a prescribed reference level and monitors the level of a tone transmitted back from the far end analog equipment. Depending upon the level of the returned signal, a unique one of a plurality of different test response level signals is synthesized by the micro-controller and supplied back to the local test facility. The respective frequencies of the test result tone signals include a first frequency indicating that the 1004 Hz tone transmitted from the far end is within a first predetermined magnitude level about the reference level (e.g. plus or minus 0.5 dB of the reference level) and a second frequency which represents that the 1004 Hz tone is within a second magnitude level about the reference (e.g. plus or minus 3 dB of the reference level). If either of these two tones is generated, the equipment is considered to be operating within tolerance and need not be taken out of service for repair or replacement. If the level of the returned 1004 Hz tone falls outside the 3 dB limit, indicating an unacceptable performance level, a third frequency is synthesized by the micro-controller back to the test facility. Finally, if the 1004 Hz tone is not returned at all, indicating a catastrophic failure of the channel, a fourth unique tone is generated. In response to either of the third or fourth tones maintenance/repair action is taken.

In accordance with a fourth far end-originated, local loop test mode, the remote servicing test facility supplies to its local channel bank a predetermined sequence of near end test (loopback request) request tones. This series of tones is representative of the location of a loopback path to be provided at a prescribed end of the local loop. These tones are digitized by the remote digital channel bank equipment and supplied over an incoming T1 channel to the analog service channel port. This test tone-representative data is decoded by the micro-controller, which then provides a loopback path at the requested location along a local communication channel containing the four wire loop to the analog data station terminal, so that the remote test service facility may test the channel. Once the remote test facility has finished testing the looped back channel, it supplies a 'disable loopback' tone, whereupon the micro-controller terminates the loopback path. Providing a loopback through analog termination equipment, to which the analog port of the local analog data station is connected, is accomplished in a conventional manner by the remote test facility supplying a standard 2713 Hz loopback/command tone customarily used to test analog termination equipment. This encoded tone is not decoded by the micro-controller, but is passed on directly to the local analog termination equipment where the loopback of its analog port is effected.

In addition, to the above described unique testing features for augmenting the capability of a conventional OCU data port, the present invention retains the conventional test capability of responding to standard latching loopback commands presently employed to test OCU data ports.

As noted earlier, one of the shortcomings of a conventional OCU data port is the fact that the particular digital code bytes employed for executing prescribed control functions (e.g. zero suppression, loss of signal or disable receiver), when directly converted into analog format for transmission over an analog channel, produce analog voltage levels which are substantially different from the signal level expected to be seen by the analog equipment, and effectively perturb the analog line. In accordance with a further feature of the present invention, this undesirable anomaly-introducing effect is circumvented by replacing the customarily used control code bytes with a different set of control function-defining code bytes which, when converted into analog format for transmission over an analog channel, e.g. by an analog data station at the customer premise, produce respective voltages that effectively correspond to voltage levels expected to be seen by an analog channel for the particular control functions. For example, in the case of a zero-suppression code byte, the conventional $98_{HEX}$ is replaced by $02_{HEX}$. When converted into analog format for transmission over the analog channel, this modified code byte yields a voltage level that effectively corresponds to a zero suppression level signal, but still provides for the requisite repetitive insertion of one bits in the data stream to maintain synchronous operation of the digital channel. Similarly, for a 'loss of signal' or 'disable receiver' code byte, the conventional $9A_{HEX}$ is replaced by $FE_{HEX}$. When converted into analog format for transmission over the analog channel, this modified code byte yields a very small voltage level that effectively corresponds to an idle condition. In addition, not only does each of the above modified code bytes ensure a repetitive insertion of one bits in the data stream, but it provides a zero in the LSB position, so as to conform with the accepted practice of permitting a zero to be used in the LSB position for control code purposes.

BRIEF DESCRIPTION OF THE DRAWINGS

FIGS. 3A–3C, 4A–4C, 5A and 6A–6D are respective flow charts of the control software employed by the analog service channel port micro-controller to implement the respective test operations of respective FIGS. 3–6.

DETAILED DESCRIPTION

Figure 1:
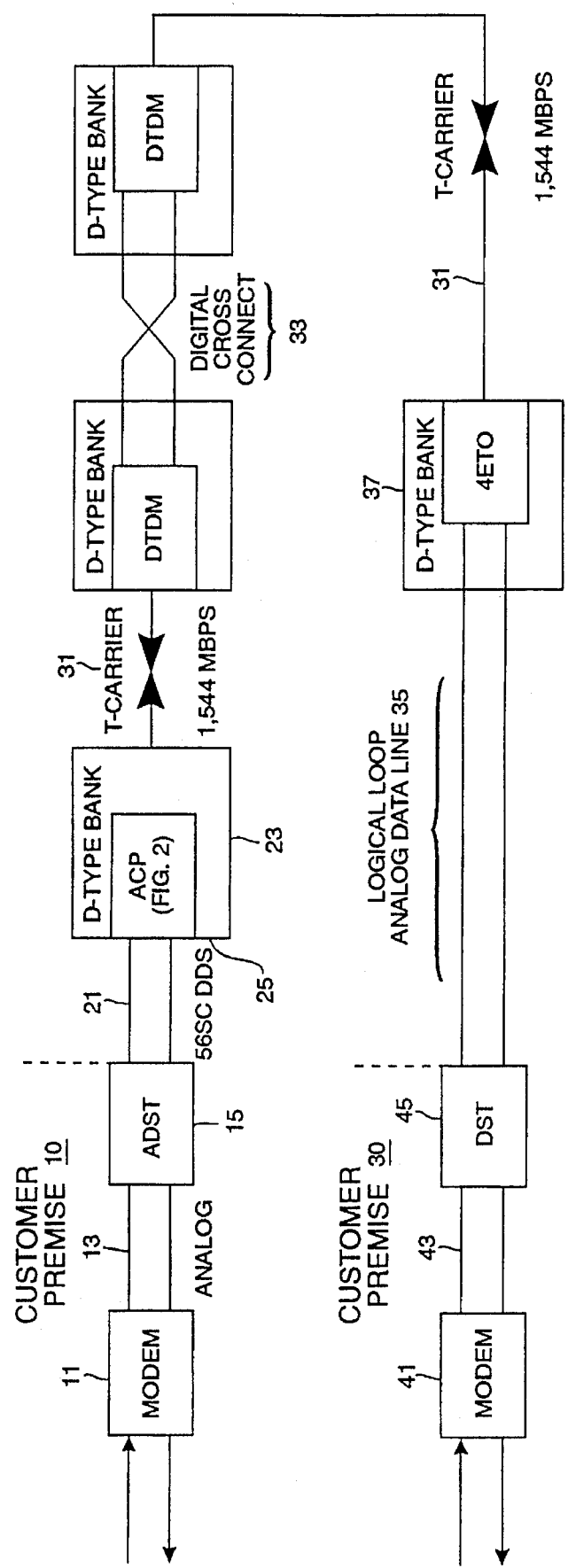
FIG. 1 diagrammatically illustrates a simplified example of a representative digital carrier telephone network with which the analog service channel port of the present invention is intended to be used.

Before describing in detail the particular improved analog service channel port in accordance with the present invention, it should be observed that the present invention resides primarily in a hardware modification of a conventional office channel unit data port, together with an augmentation of the control software employed by the data port's micro-controller. The circuitry of the OCU data port is otherwise essentially unaffected. Accordingly, the configuration of the improved OCU data port and the manner in which it is interfaced with other communication equipment of the telephone network are illustrated in the drawings by a readily understandable block diagrams which show only those specific details that are pertinent to the present invention, so as not to obscure the disclosure with details which will be readily apparent to those skilled in the art having the benefit of the description herein. Thus, the block diagram illustrations of the figures are primarily intended to illustrate the major components of the system in a convenient functional grouping, whereby the present invention may be more readily understood.

FIG. 1 diagrammatically illustrates a simplified example of a representative digital carrier telephone network with which the analog service channel port of the present invention is intended to be used. The network itself is shown as comprising a first, near-end, customer premise 10 containing a modem 11 through outgoing which (digital) communication signals from customer terminal equipment, such as digital computer or facsimile machine (not shown), are converted into analog format for transmission over a voice band analog channel 13 to central office equipment of the telephone company. Similarly, modem 11 converts incoming analog format signals on the receive end of analog channel 13 into digital format for application to the customer's terminal equipment.

As described in the above-referenced Smith et al application, analog channel 13 is interfaced with a digital carrier system 20 by means of analog/digital interface equipment, termed an analog data station terminal, 15 located at the customer premise 10. Analog data station terminal 15 contains analog/digital interface and synchronous communication circuitry for providing full duplex digital communication capability, via a local, four wire, 56 Kb/s secondary channel 21, to a D-type channel bank 23. Channel bank 23 contains an office channel unit (OCU) data port 25, modified in accordance with the present invention to provide an analog service channel port to be described in detail below, which provides 64 Kb/s digital data service (DDS) over a T1 (1.544 Mb/s) channel 31. T1 channel 31 may include one or more pairs of complementary (digital cross-connected) D-type channel banks 33, as shown.

A second, remote end of the network itself is shown as comprising a customer premise 30. Like customer premise 10 at the near end of the network, the far end customer premise may contain an associated modem 41 through which outgoing (digital) communication signals from a customer terminal equipment are converted into analog format for transmission over a voice band analog channel 43 to the digital carrier (DDS) equipment. Also, modem 41 converts incoming analog format signals on analog channel 43 into digital format for application to the customer's terminal equipment. Analog channel 43 is also preferably interfaced by way of an analog data station terminal 45 with a 56 Kb/s secondary channel 35 from a D-type channel bank 37, to which T1 channel 31 is connected. As at the upstream end of the network, channel bank 37 preferably contains an analog channel service-modified OCU data port, which interfaces T1 channel 31 with local four wire channel 35. As described in the above referenced Smith et al application, by virtue of the analog data station terminal at the customer premises, modem 11 appears to be coupled directly to the digital multiplexing equipment at the central office.

Synchronization between an analog data station terminal and the central office is achieved by incorporating a framing pattern in the digital transmission bit stream. In particular, the 56 Kb/s data rate is increased to a 72 Kb/s data rate by the insertion of a framing bit and an eighth data bit to a standard seven bit data word. The framing bit is located at the same bit position in each data word, so that it can be readily detected. A preferred framing scheme provided for this purpose is described in detail in U.S. patent application Ser. No. 634,435, filed Dec. 27, 1989, U.S. Pat. No. 5,144,625, entitled "Digital Subscriber Line Termination With Signalling," by R. Cain et al, assigned to the assignee of the present application and the disclosure of which is incorporated herein.

In accordance with the Cain et al framing mechanism, the 72 Kb/s signal is subdivided into data words, each nine bits long, to yield 'extended' bytes which consist of eight bits of data and a single framing synchronization bit. Each data byte can be transported to or from the customer in synchronism with the eight KHz byte rate employed by the DDS network. In addition, because the framing mechanism employs a prescribed pattern for the framing bits in each data word, the analog data station terminal or the office channel unit at the central office is able to detect and maintain proper byte alignment, so that no information is lost.

In operation, the analog data station terminal receives a serial digital data stream from the central office channel unit at the local loop rate, such as 72 KHz. The bit rate clock of the received data stream is recovered and used to clock data back to the central office from the customer premise. The eight KHz (DDS) network byte clock and the sixty-four KHz network bit clock are derived from the recovered customer loop bit clock and coupled to the analog/digital encoding circuitry within the analog data station terminal to synchronize the encoding process. Outgoing data from the customer premise is formatted as an N-bit parallel data word synchronized with the eight KHz network byte clock. A respective N-bit byte is combined with a successive framing bit of the framing bit pattern to provide a data stream back to the central office at the local loop bit rate. For more specific details of the configuration and operation of the analog data station terminal and the 'extended' byte data format, attention may be directed to the previously referenced Smith et al and Cain et al applications.

Figure 2:
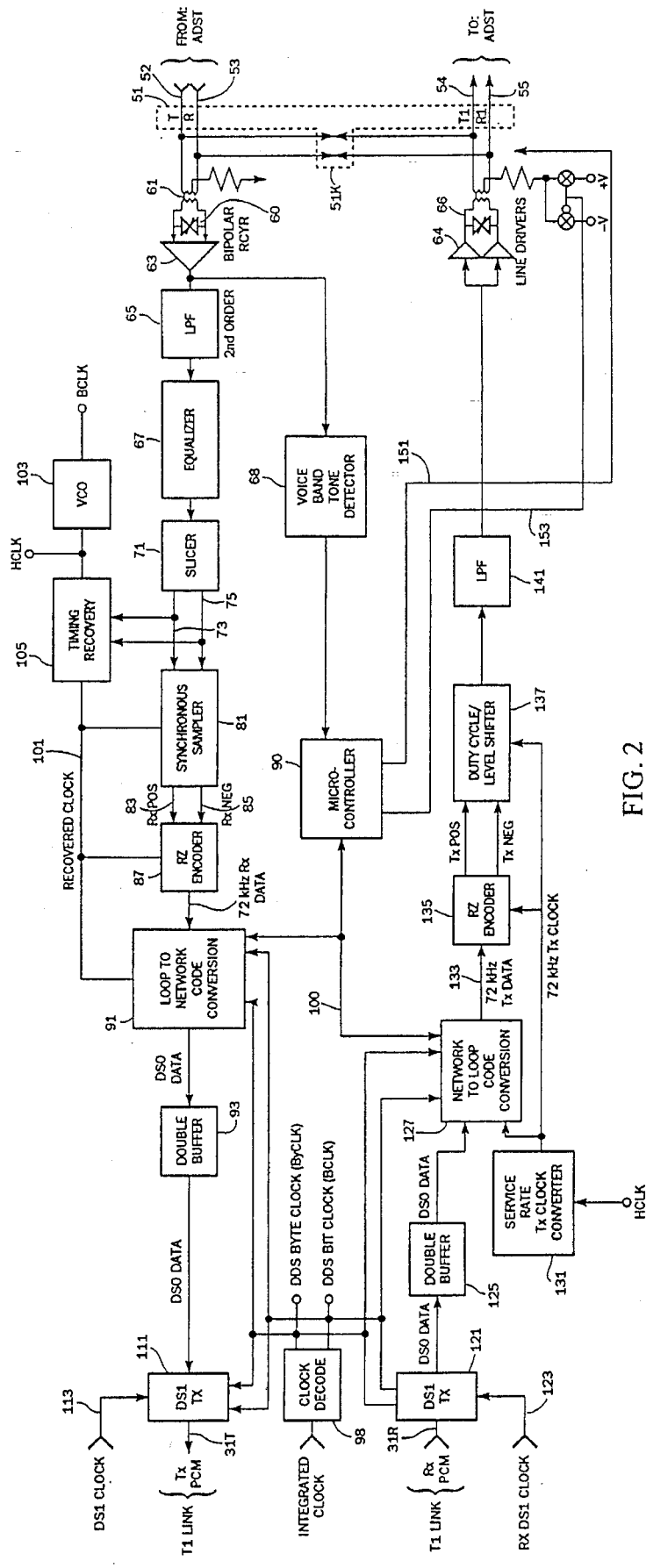
FIG. 2 diagrammatically illustrates the configuration of an office channel unit data port that has been modified in accordance with the present invention to provide additional analog tone test access functionality.
Figure 3:
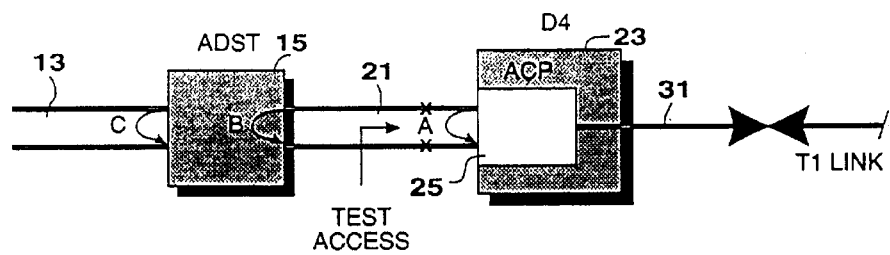
FIGS. 3–7 diagrammatically illustrate respectively different test operations that are carried out by the diagnostic test mechanism embodied in the control software of the micro-controller within the analog services channel port shown in FIG. 2.
Figure 4:
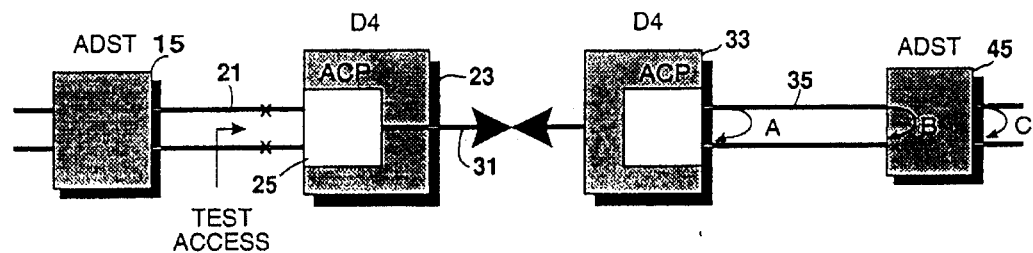
Figure 5:
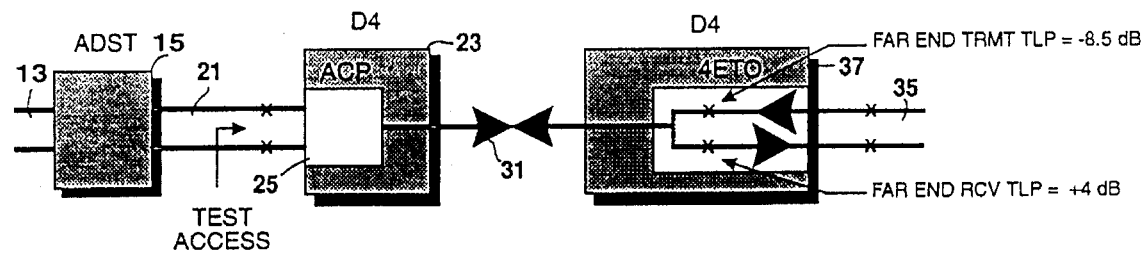
Figure 3A:
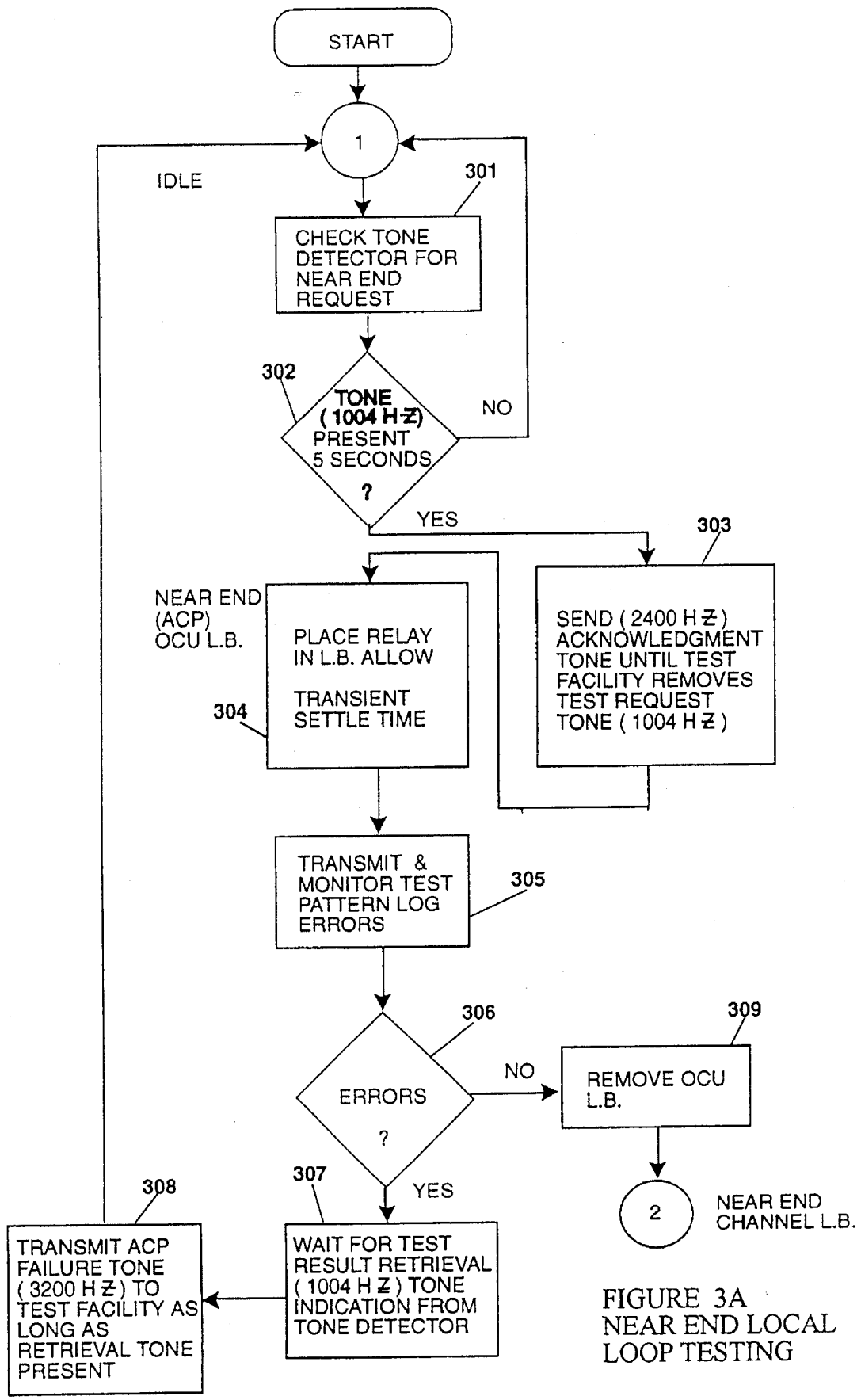
Figure 3B:
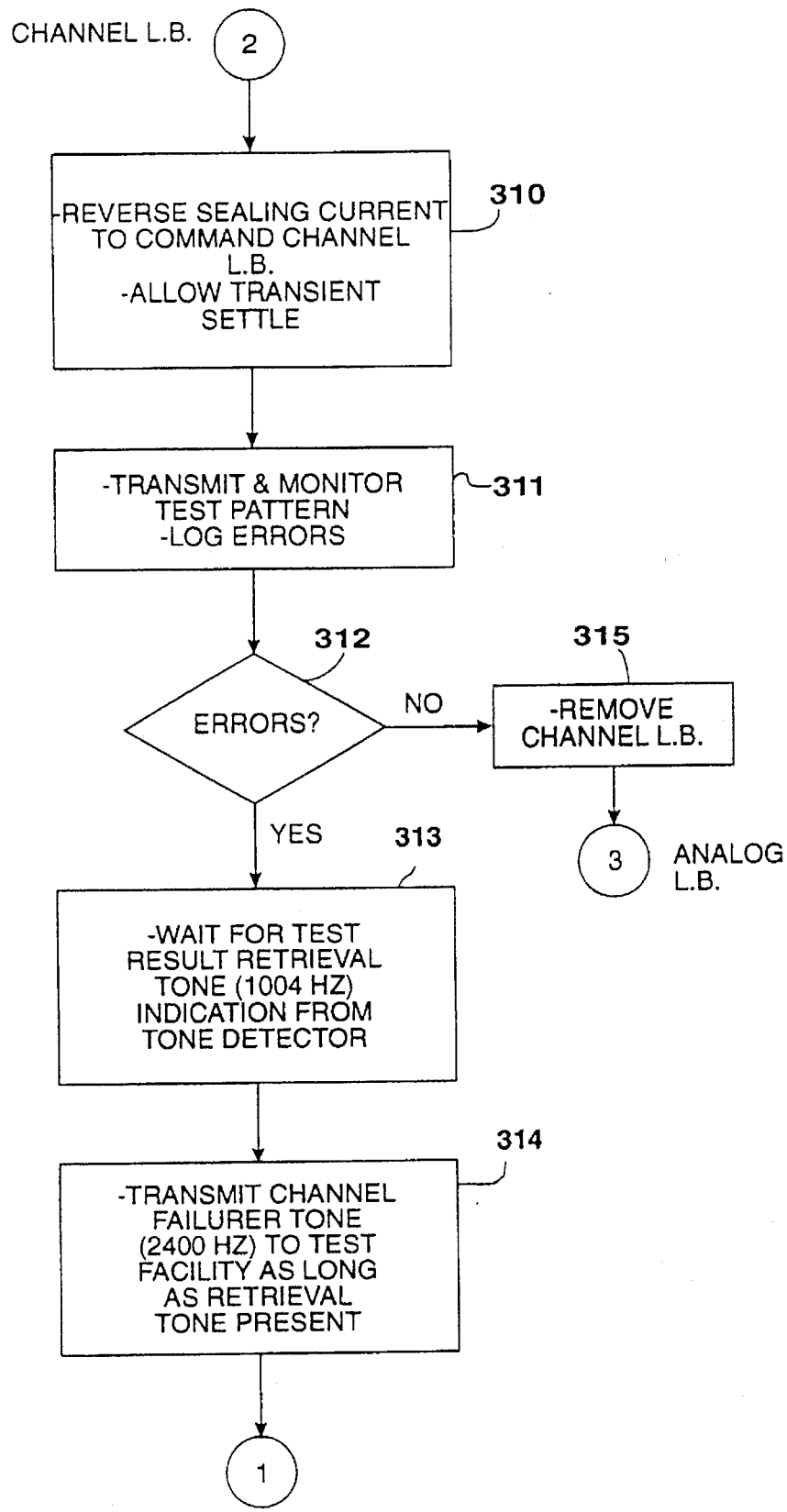
Figure 3C:
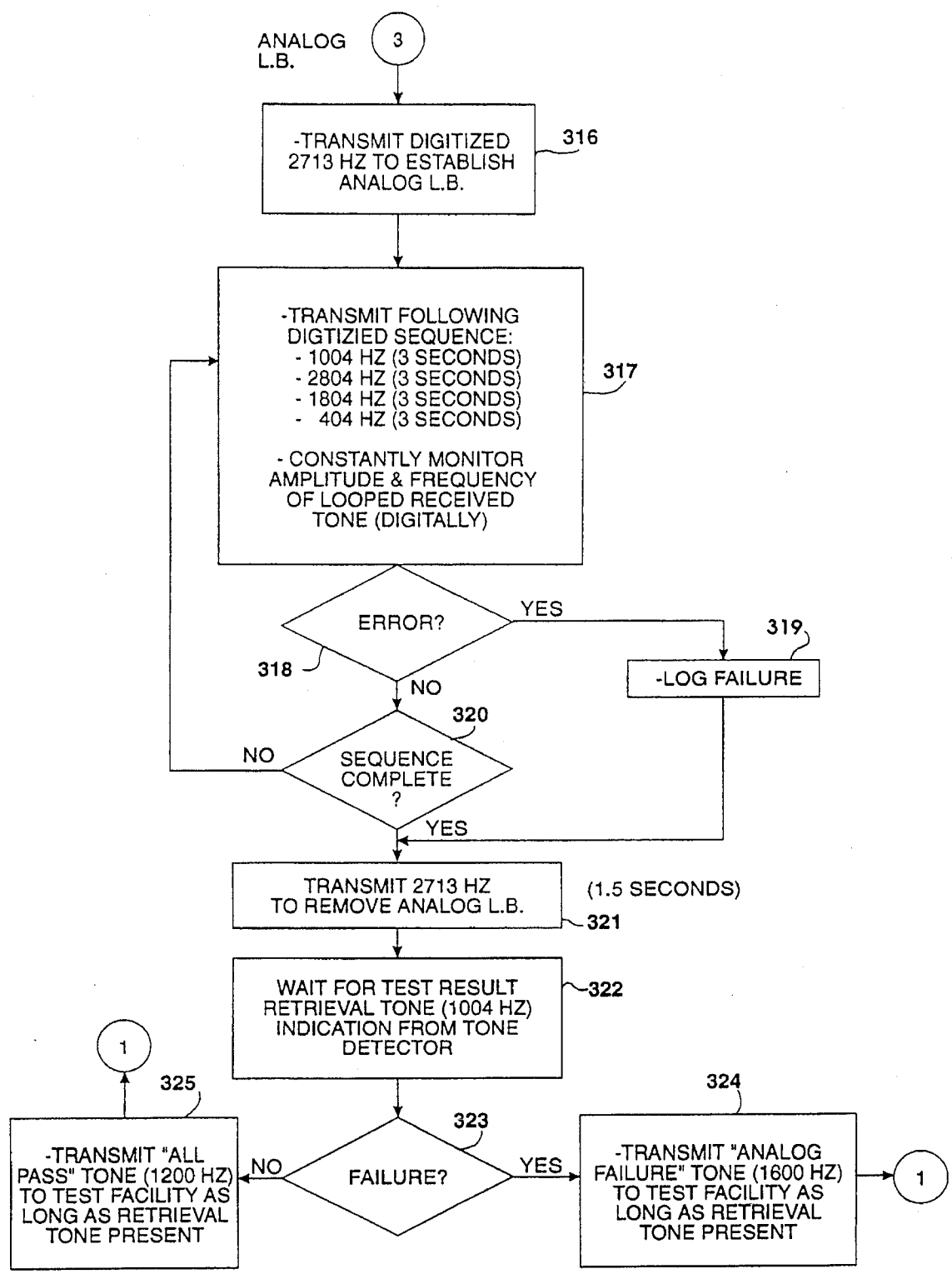
Figure 4A:
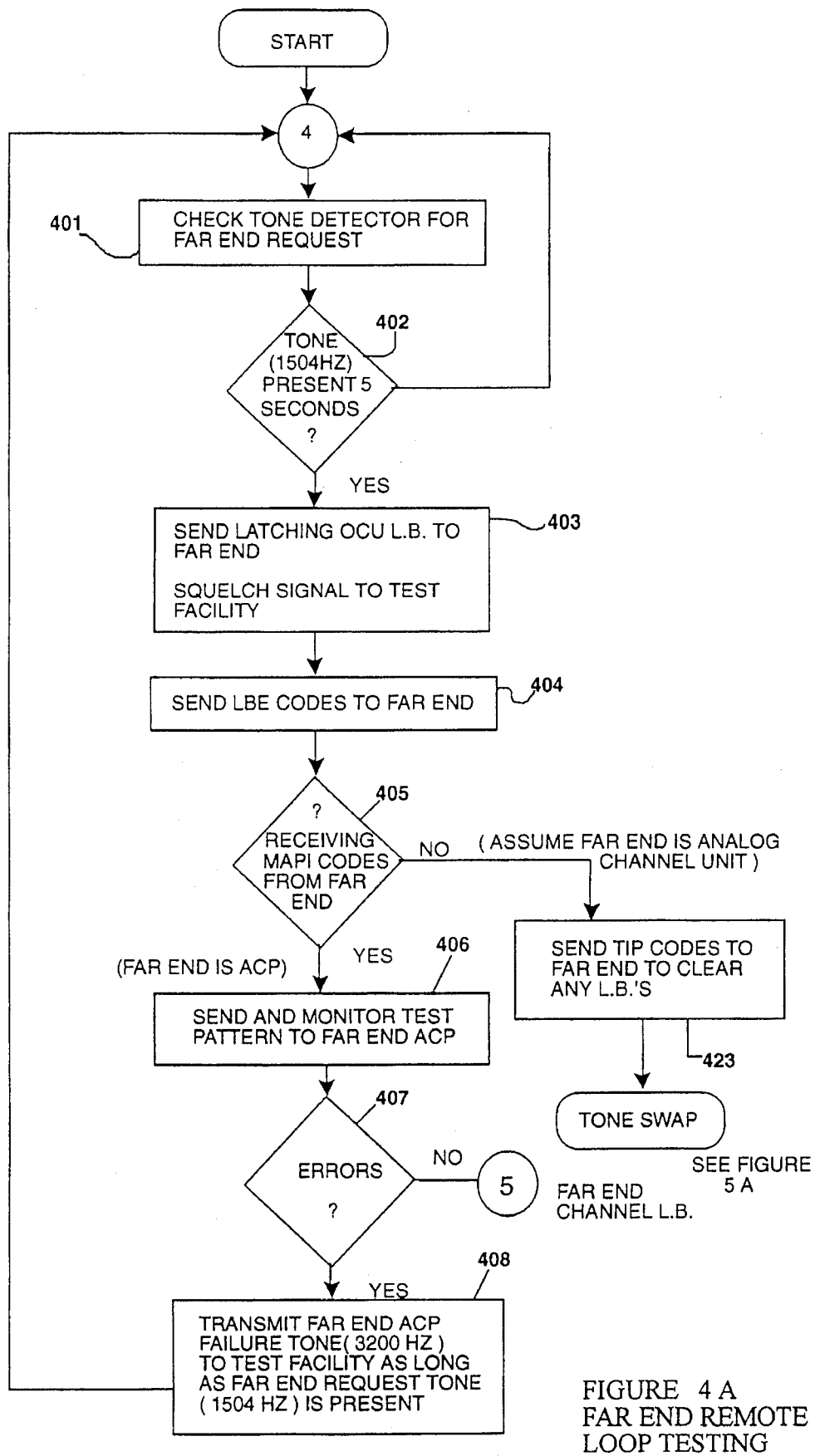
Figure 4B:
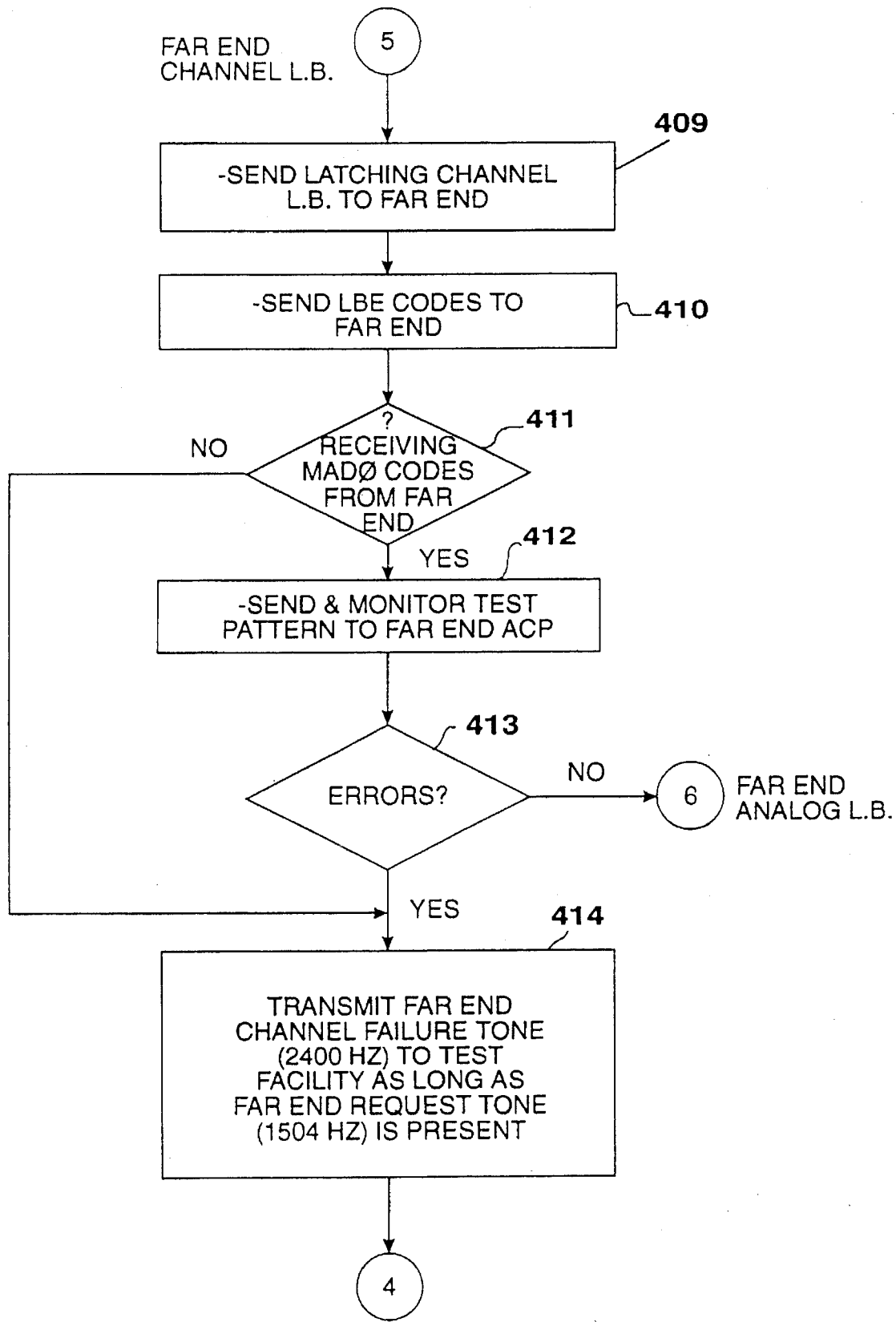
Figure 4C:
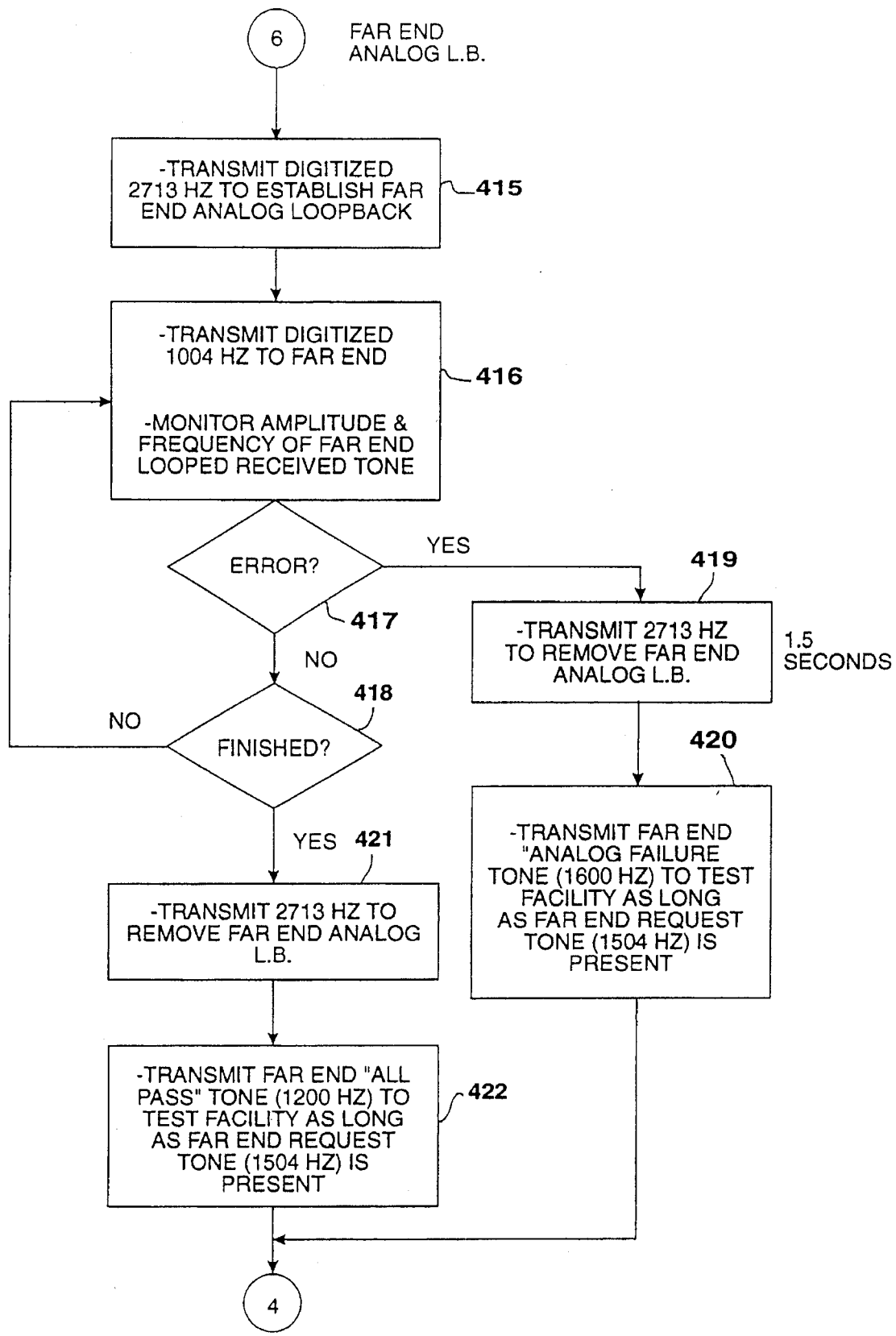
Figure 5:
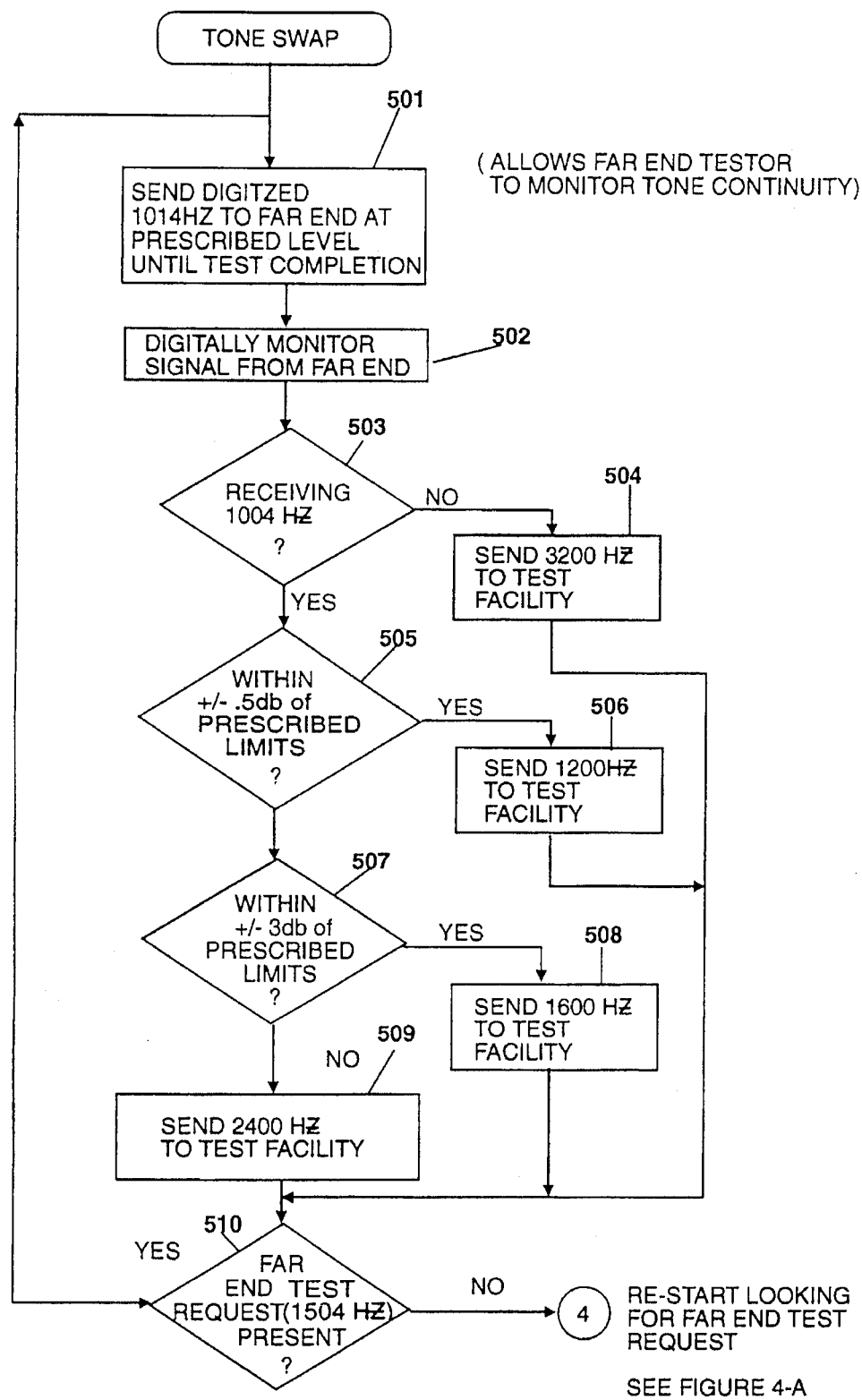
Figure 6:
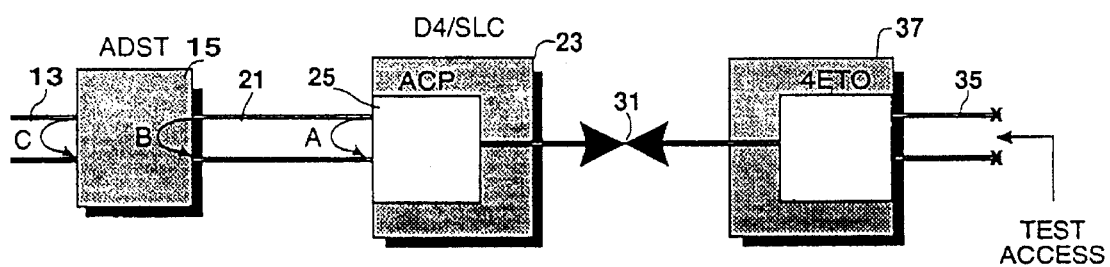

FIG. 2 diagrammatically illustrates the configuration of an OCU data port, such as a Model No. 1102006A, manufactured by Adtran Corporation, Huntsville, Ala., that has been modified in accordance with the present invention to provide additional analog tone test access functionality. Since the invention resides primarily in a hardware modification of a conventional office channel unit data port and enhancements to the control software employed by the data port's microcontroller, the configuration and operation of those components of the OCU data port that are conventional will only be generally described. Where more detail is desired attention may be directed to equipment itself and to information supplied by the manufacturers of such equipment, such as that identified above.

As shown in FIG. 2, the analog service channel port in accordance with the present invention comprises a four-wire relay interface 51, comprised of tip (T) and ring (R) input and output pins 52, 53 and 54, 55 to which the tip and ring lines of the local loop, such as local loop 21 of FIG. 1, are coupled. Relay interface 51 couples respective tip and ring input pins 52, 53 through an overvoltage protection Zener diode pair 60 and a local loop input coupling transformer 61 to a bipolar receiver 63, while an output coupling transformer 62 couples the outputs of a pair of line drivers 64, having an overvoltage Zener diode pair 66, to pins respective tip and ring output pins 54, 55. The output of bipolar receiver 63 is coupled to a voice band tone detector 68 and through a second order low pass filter 65 to an equalizer 67. Low pass filter 65, when combined with a first order filter stage at a remote transmitter, preferably forms a third order Butterworth filter having a cutoff frequency on the order of 1.3 times the loop data rate of 72 KHz. Equalizer 67 provides amplitude and frequency compensation for the loop cable.

To recover data within the incoming 72 KHz bipolar data stream from local loop channel 21, the output of equalizer 67 is coupled to a bit slice circuit 71, which compares the equalized signal to threshold levels that are set at one-half the magnitude of the positive and negative peaks of the bipolar data stream and outputs a dual polarity digital representation of the received data on complementary polarity links 73, 75. The data is sampled in synchronous sampling circuit 81 and coupled over respective positive and negative polarity data links 83 and 85 to a return to zero (RZ) decoder 87, which outputs a digital serial data in accordance with the contents of the RZ data stream. The 72 KHz digital data is then coupled to a loop-to-network code converter 91 which, under the control of a port microprocessor 90 (microcontroller), extracts the framing pattern bits inserted by the analog data station terminal and thereby provides a 64 Kb/s (DS0) data stream to a transmit buffer unit 93. Transmit buffer 93 is used to prevent byte slips due to phase shifts between the 64 KHz clock and the T1 (1.544 MHz) clocks. The DS0 bit and byte timing are derived from an integrated clock supplied by the D4 channel bank common equipment. This clock is generated by a clock decode/generator 98 as a 64 KHz 5/8 duty cycle square wave, with every eighth pulse at double amplitude to provide byte timing.

Loop-to-network code converter 91 is also used by micro-controller 90 to insert control function code bytes, such as the above-referenced zero-suppression and receiver disable codes, into the DS0 data stream. Timing for the synchronous operation of sampler 81, RZ decoder 87 and loop-to-network code converter 91 is obtained by a clock recovery loop 101, which includes a local voltage controlled oscillator 103 and phase lock circuit 105, to derive a recovered clock on link 107 that is locked in phase with the received data stream. Data that has been stored in transmit buffer 93 is read out and transmitted by a PCM transmitter 111 over T1 transmit link 31T. A DS1 bit clock (1.544 MHz) for transmitter 111 is supplied over DS1 clock link 113 by the common channel bank equipment.

Data contained in the DS0 data stream is clocked into the transmit buffer 93 by the DS0 bit clock and is gated onto the PCM bus (T1 channel 21) by the DS1 clock. When not selected, the office channel unit presents a high source impedance to the T1 PCM link. Incoming T1 PCM data from the D4 channel bank common equipment is clocked from a receive link portion 31R of the PCM data bus into a receiver buffer register unit 121 under the control of a 1.544 MHz DS1 receive clock supplied over receive clock link 123. The contents of receiver buffer register unit 121 are unloaded synchronously into a buffer unit 125 by DS0 bit and byte clocks supplied by clock decoder 98. Buffer unit is coupled to a network-to-loop code converter 127, which is driven by a variable rate clock generator 131 under the control of micro-controller 90. For normal data 56 Kb/s secondary channel data communications, clock generator 131 outputs a 72 KHz clock to network-to-loop code converter 127, which formats DS0 data from the D4 channel bank to include an additional framing bit taken from a prescribed framing sequence, such as the repeated framing pattern '101100' described in the above referenced Cain et al application. Network-to-loop code converter 127 is also employed to controllably insert prescribed control codes, such as the above-referenced 'disable receiver' or 'loss of signal' code byte to be substituted for DS0 data bytes when there is either a loss of signal or a unit coupled to the channel is asserted quiet (turned off). During micro-controller sourced (synthesized) tone generation, the data applied to network-to-loop code converter 127 comprises a sequence of 'ones' which are clocked out at twice the intended tone frequency. Thus, to synthesize a 1600 Hz tone, the digital stream of one bits is clocked out at 3200 Kb/s.

The 72 Kb/s data stream supplied by network-to-loop code converter 127 is coupled over a 72 KHz serial data link 133 to an RZ encoder 135, which encodes the data stream into a bipolar, return-to-zero format. The bipolar data is then output by a cascaded duty cycle/level shift circuit 137 as a pair of complementary 50% duty cycle pulses, which are filtered by a low pass filter 141 and coupled over link 143 to line drivers 64. As explained previously, line drivers 64 drive the secondary winding of tip and ring coupling transformer 62, the primary of which is coupled to tip and ring output pins 54 and 55, to which the digital channel 21 to the customer premise is coupled. Control of channel loopback and office channel unit loopback operations is effected by way of respective control lines 151 and 153 from micro-controller 90 to impedance termination stage 155 and relay interface 51.

As noted earlier, the analog service channel port diagrammatically illustrated in FIG. 2 is configured and operates, for the most part, substantially the same as a conventional OCU data port, so as to provide an interface between DS0 and DS1 digital data channels. In order to provide the additional capability of accepting analog tone test command signals from an analog tone test service facility, the analog service channel port of the present invention further includes a voice band tone detector 68, the input of which is coupled to the output of bipolar receiver 63 and the output of which is coupled to micro-controller 90, for monitoring the local customer loop for the presence of analog-sourced test tone signals. In addition, the control software within micro-controller 90 employs a prescribed set of replacement control function-defining digital code bytes which, when converted into analog format by an analog data station at the customer premise, produce respective voltages that effectively correspond to the analog line signal levels expected to be seen by an analog channel for respective ones of such control functions.

Voice band tone detector 68 preferably comprises a phase lock loop which is tuned to respond to a near end test command tone (e.g. 1004 Hz) and to a far end test command tone (e.g. 1504 Hz). Tone detector 68 monitors the output of bipolar receiver 63 for the presence of either of these tone signals on the local loop 21. As will be described in detail below, the control software within micro-controller 90 responds to these test tone signals by conducting a series of loopback tests of selected portions of the network, and then controllably synthesizing test result-representative tone signals back to the attendant test facility. The multiple test capability of the present invention will be described below with reference to FIGS. 3–7, which diagrammatically illustrate respectively different test operations that are carried out by the diagnostic test mechanism embodied in the control software of micro-controller 90. Associated with respective FIGS. 3–6 are respective FIGS. 3A–3C, 4A–4C, 5 and 6A–6D, which contain flow charts of the control software employed by micro-controller 90 to implement the respective test operations.

NEAR END (LOCAL LOOP) TESTING (FIGS. 3, 3A–3C)

In accordance with a first, near end-originated, local loop test mode, a near end test request tone, such as the above-identified 1004 Hz tone, is coupled from a diagnostic servicing test center (not shown) to the analog service channel port by way of a metallic SMAS point on the four wire local loop 21 (STEP 301). This near end test request tone is applied to input pins 52, 53 and output by bipolar receiver 60 to tone detector 68. Since the 1004 Hz tone is one of the two tones to which the phase lock loop of tone detector 68 responds, tone detector 68 couples an output to micro-controller 90 indicating that a near end test request has been present for a prescribed period of time, for example, five seconds, (QUERY STEP 302). After a defined time out period (e.g. ten seconds), micro-controller 90 responds by synthesizing an encoded acknowledgement tone (e.g. 2400 Hz) via data bus 100 to network-to-loop code converter 127, so that a synthesized 2400 Hz tone is output from line driver 64 to transformer 62 for application to local loop 21 and back to the service test facility (STEP 303). Upon seeing this 2400 Hz acknowledgment tone, the service test facility removes the (1004 Hz) test request tone from the loop and returns the line to normal operating conditions for a period on the order of thirty seconds. During this time, micro-controller 90 proceeds to conduct a prescribed series of loopback tests along the local loop, down through the analog channel side of the analog data station terminal.

A first of these local loop tests comprises testing an office channel unit loopback path A. Micro-controller 90 establishes a channel unit loopback path via control link 153, which operates relay interface 51 to close normally open relay contacts 51K and thereby complete a closed loop path through the local loop port (STEP 304). With local loopback path A completed, micro-controller 90 tests the continuity of loopback path A, by transmitting a prescribed digitally encoded test message and monitors the quality of the return signal through data bus 100 (STEP 305). A code representative of whether or not a test of this first loopback path A is successful is then stored internally by the micro-controller. If the first (office channel unit) loopback test is unsuccessful (STEP 306), the stored code is representative of the synthesis of a first prescribed failure tone (e.g. a 3200 Hz tone) to be returned to the servicing test facility (STEPS 307–308). If the first loopback test is successful, however, micro-controller 90 proceeds to test the far end of the local loop 21 at location B (STEP 309).

For this purpose, the sealing current in link 151 is reversed (STEP 310). This reversal is sensed by the remote unit, which causes the analog data station at the far end of the local loop 21 to provide a cross-connect path B. With local loopback path B completed, micro-controller 90 again transmits a test message, monitors the quality of the returned signal and conducts continuity test of loopback path B through data bus 100 (STEP 311). As in the test of path A, a code representative of whether or not this second loopback test (of path B) is successful is stored in the micro-controller's local memory (QUERY STEP 312). If the test is unsuccessful, however, the stored code is representative of the synthesis of a second prescribed failure tone (e.g. a 2400 Hz tone) to be returned to the servicing test facility (STEPS 313, 314).

If the second loopback test (of path B) is successful (STEP 315), micro-controller 90 proceeds to conduct a multiple (e.g. four) tone sweep (across the voice frequency band) of the loopback path C through the analog channel port end of the analog data station (STEP 316). The looping of path C is effected in accordance with encoded instructions injected into the 72 b/s data stream output by network-to-loop code converter 127 to the analog data station. For each of the synthesized four tones transmitted over the local loop, the quality of the returned signal (recovered by loop-to-network code converter) 91 is monitored by micro-controller 90 (STEP 317). If the loopback test of path C fails, a third failure tone (e.g. 1600 Hz) representative code is stored (STEPS 318, 319). If this final loopback path test is successful (STEP 320), a fourth (all pass) tone (e.g. 1200 Hz) representative code is stored. The micro-controller then removes the analog loop-back path (STEP 321) and waits for a test result retrieval tone (STEP 322).

When the servicing test facility wishes to retrieve the results of the local loop tests, it again applies a 1004 Hz tone to loop 21. After a prescribed time out period (e.g. ten seconds), micro-controller 90 responds by synthesizing out a test result code via data bus 100 to network-to-loop code converter 127, so that a synthesized tone is output from line driver 64 to transformer 62 for application to local loop 21 and back to the service test facility. Depending upon the results of the loopback tests (STEP 323), a unique one of the stored plurality of different test result tone codes is synthesized by the micro-controller and supplied back to the test facility as a unique tone (STEPS 324, 325). As described above, the respective frequencies of the test result tone signals include a 1200 Hz tone indicating that all loopback tests (through successively tested loopback paths A, B and C) have been passed (STEP 325) and, if not, the tone generated (one of the frequencies 3200 Hz, 2400 Hz or 1600 Hz) identifies the location of a test failure (one of loopback locations A, B or C (STEP 324). It should be noted that if a test of loopback path A fails, there is no further testing of paths, B and C, since such paths would automatically fail if path A fails. Likewise, if a test of loopback path B fails, there is no further testing of path C, since path C would fail if either of paths A or B fails.

FAR END (REMOTE LOOP) TESTING (FIGS. 4, 4A–4C)

In accordance with a second, far end loop test mode, similar to the near end test mode, a far end test request tone, different from the near end test tone of 1004 Hz, such as a 1504 Hz tone, is coupled from the diagnostic servicing test center to the analog service channel port by way of a metallic SMAS point on the four wire local loop 21, and detected by tone detector 68 (STEP 401). Since the far end representative test tone of 1504 Hz is the other of the two tones to which the phase lock loop of tone detector 68 responds, tone detector 68 couples an output to micro-controller 90 indicating that a far end test request has been received (answer to QUERY STEP 402 is YES). As in the first test mode, the micro-controller conducts a series of loopback tests along the remote loop through the analog channel side of the analog data station terminal. Again, depending upon the results of these tests, a unique one of a plurality of different test result tone signals is synthesized generated by the micro-controller and supplied back to the test facility in response to a test results retrieval tone.

Before conducting a remote end test, the analog channel port sends a message to the remote equipment to determine whether or not it is connected to another analog service channel port or a conventional (e.g. 4ETO) analog channel unit (STEP 404). If the remote station contains an analog service channel port, it's control software is configured to loopback the inquiry message for conformation. Thus, the local analog service channel port looks for a return of the inquiry message (QUERY STEP 405). For the present case that the far end station contains an analog service channel port, the micro-controller of the near end analog channel port which has detected the far end test tone command of 1504 Hz proceeds to conduct a prescribed series of loopback tests on the far end circuit, similar to those employed for near end testing, down through the analog channel side of the remote analog data station terminal. (For the case that the far end station is an analog channel unit (STEP 423), a tone swap test is conducted, as described below with reference to FIGS. 5, 5A.

A first of these tests comprises an office channel unit loopback by the far end analog service channel port through loopback path A (STEP 406). As in the case of a near end test described above, a loopback path is established via the remote unit's control link 153, which operates relay interface 51 to close normally open relay contacts 51K and thereby complete a closed loop path through the remote loop path A. With remote loopback path A completed, microcontroller 90 in the near end analog channel port tests the continuity of the remote loopback path, monitoring the quality of the returned test signal through data bus 100. A code representative of whether or not this first remote loopback test through remote path A is successful is stored (STEP 407). If the loopback test through path A of the remote unit's local loop is unsuccessful (answer to QUERY STEP 407 is YES), the cause could be either a problem in the remote channel unit itself, or a problem on the T1 data channel. In either case, the stored code is representative of the synthesis of a prescribed far end failure path A tone (e.g. a 3200 Hz tone) to be returned to the servicing test facility (STEP 408). If the remote office channel unit loopback path A test is successful (answer to QUERY STEP 407 is NO), micro-controller 90 next proceeds to test the far end of the remote loop 21 via loopback path B (STEP 409).

For this purpose, the voltage on link 151 of the remote analog service channel port is reversed, which causes the analog data station at the far end of the remote loop to provide a cross-connect through path B (STEPS 410,411). With loopback path B completed, micro-controller 90 conducts a continuity test of loopback path B, as in the near end test of its path B, monitoring the return signal, and storing a code representative of whether or not this second loopback test is successful (STEPS 412, 413). If the test of remote loopback path B is unsuccessful, the stored code is representative of the synthesis of a second prescribed failure tone (e.g. a 2400 Hz tone) to be returned to the servicing test facility (STEP 414). If the second loopback test is successful, micro-controller 90 proceeds to conduct a test of the loopback path C through the far end of the remote analog data terminal station (STEPS 415–422). If the test of remote loopback path C fails, a third failure tone (e.g. 1600 Hz) representative code is stored. Similarly, if the test of remote loopback path C is successful, a fourth (all pass) tone (e.g. 1200 Hz) representative code is stored.

Upon completion of all tests, micro-controller 90 responds by synthesizing out a test result code via data bus 100 to network-to-tone code converter 127, so that a test result representative synthesized tone is output from line driver 64 to transformer 62 for application to local loop 21 and back to the service test facility. As in the case of near end testing, depending upon the results of the remote loopback tests, a unique one of the plurality of different test result tone codes is synthesized by the micro-controller and supplied back to the test facility as a unique tone. As described above, the respective frequencies of the test result tone signals include a 1200 Hz tone indicating that all loopback tests have been passed (STEP 422) and, if not, the tone generated (one of the frequencies 3200 Hz, 2400 Hz or 1600 Hz) identifies the location of a test failure (one of loopback locations (A, B or C).

ANALOG TONE SWAP FAR END TEST (FIG. 5, 5A)

As explained above, upon receipt of a remote end test command tone (1504 Hz), the near end analog service channel port sends a message to the remote equipment to determine whether or not the remote channel unit is another analog service channel port or a conventional (e.g. 4ETO) analog channel unit. If the remote station contains an analog service channel port, it's control software is configured to loopback the inquiry message for conformation. Thus, the local analog service channel port looks for a return of the inquiry message. If the far end station does not contain an analog service channel port, the micro-controller of the near end analog channel port proceeds to conduct a tone swap test with the far end circuit.

In accordance with this third, near end-originated, analog tone swap test mode, when the far end equipment has been determined by the near end analog service channel port not to be another analog service channel port, micro-controller 90 synthesizes a 1014 Hz tone at a prescribed signal level and then monitors the level of a 1004 Hz tone received from the far end equipment (STEPS 501, 502, 503, 510). Depending upon the level of the returned signal, a unique one of a plurality of different test response level signals is synthesized by the micro-controller and supplied back to the test facility. If the returned 1004 Hz test tone is within a first predetermined magnitude level about the reference level (e.g. plus or minus 0.5 dB of the reference level) (STEP 505), the test result tone has a first frequency (e.g. 1200 Hz) (STEP 506). If the returned 1004 Hz tone is within a second magnitude level about the reference level (e.g. plus or minus 3 dB of the reference level) (STEP 507), the test result tone has a second frequency (e.g. 1600 Hz) (STEP 508). If either of these two tones is generated, the equipment is considered to be operating within tolerance and need not be taken out of service for repair or replacement. If the level of the returned 1004 Hz tone falls outside the 3 dB limit, however, indicating an unacceptable performance level, a third frequency (e.g. 2400 Hz) is synthesized by the micro-controller back to the test facility (STEP 509). Finally, if the 1004 Hz tone is not returned at all, indicating a catastrophic failure of the channel, a fourth unique tone (e.g. 3200 Hz) is generated (STEP 504). In response to either of the third or fourth tones maintenance/repair action is taken.

REMOTELY COMMANDED LOCAL LOOP TEST (FIG. 6, 6A–6D)

In accordance with a fourth, far end-originated, near end loopback test mode, the remote servicing test facility supplies to its local channel bank (such as D4 channel bank 37 shown in FIGS. 1 and 6), a predetermined sequence of near end test request tones. The particular series of tones is representative of a loopback test to be conducted at a prescribed location along the near end loop. At the remote channel bank 37, theses tones are digitized and supplied over the T1 channel 31 to the near end analog service channel port 25. This incoming DS1 test tone-representative data is received as normal data traffic and buffered in the network-to-loop code converter 127. The captured data is then read by micro-controller 90, which proceeds to conduct the requested test, specifically testing a loopback path at the prescribed location along the near end four wire loop 21. To permit remote analog testing of a closed loopback path A, micro-controller 90 within the near end analog channel port energizes relay 51 to thereby latch local loopback path A.

More particularly, as shown in FIG. 6A–6D, testing local loopback path A at the analog channel port (ACP) end of the near end loop 21 involves the use of three successive tone-representative codes, respectively associated with the frequencies of 634 Hz (alert tone), 484 Hz (sequence select tone) and 564 Hz (activate loopback tone), each tone being of a predetermined minimum duration (e.g. at least five seconds), which are supplied from the remote channel unit 37 and decoded in the near end analog channel port 25. Thus, at query STEP 601, the presence of an alert tone A (634 Hz) is monitored. If this first, alert tone is present for five seconds, the routine proceeds to execute STEP 603, in which any analog commanded loopbacks are removed, and STEP 605 in which a loopback command timeout of 25 seconds is performed. Upon the termination of the alert tone (the answer to query STEP 607 is yes), the routine proceeds to monitor the line for the next tone in the sequence (sequence select tone B or 484 Hz). If this second tone is present for five seconds, the answer to query STEP 611 is yes, the routine proceeds to execute STEP 613, in which the loopback command timeout is reset at 25 seconds. Upon the termination of the tone B, (the answer to query STEP 615 is yes), the routine proceeds to STEP 621, to monitor the line for the next tone in the sequence (here, tone D=434 Hz). In the case of an ACP loopback sequence, tone D will be present, so that the answer to query STEP 621 will be yes, and the routine proceeds to STEP 661 in FIG. 6C, resetting the analog commanded loopback timer at twenty minutes and placing the unit in an analog commanded analog channel port loopback mode. Tone D of the three ACP loopback sequence is then maintained in memory until removed and, in STEP 662, a digitized 1014 Hz tone is transmitted to the far end of the loop. Once the third tone D is terminated (the answer to STEP 663 is yes), the loop returns to its normal data transmission status (STEP 665) and the routine returns to its starting location (STEP 601, FIG. 6A).

For testing near end loopback path B at the analog data station end of the near end loop 21, five successive tone-representative codes A-B-C-B-D, respectively associated with the frequencies of A=634 Hz (alert tone), B=484 Hz (sequence select tone), C=434 Hz (transparent mode tone), B=484 Hz (sequence select tone) and D=564 Hz (activate loopback tone), each tone being of a minimum duration of at least five seconds, are supplied from the remote channel unit 37 and decoded in the near end analog channel port 25. In response to this five tone sequence, micro-controller 90 of the near end analog channel port reverses the sealing current in the local loop 21 via control line 153, as described previously in connection with loopback path B of FIG. 3, so that the test facility may test the loop. As in the three tone test sequence, at the completion of the test of loopback path B, the test facility supplies a release loopback tone, in response to which the near end analog channel port reverses the sealing current, so as to open the loopback path B. Again, if the release loopback tone is not received within a defined time period (e.g. twenty minutes), a soft-timer within the micro-controller causes the release of the closed path B.

More specifically, for a channel loopback (five tone sequence), upon the termination of the tone B, the answer to query STEP 621 of the above described software routine will be no, so that the routine will proceed to STEP 623, rather than STEP 661, in order to monitor the line for the presence of tone C (564 Hz). If tone C is not received (the answer to query STEP 623 is no, the routine proceeds to query STEP 625, to conduct a 25 second loopback command timeout. If the third tone in the channel loopback, five tone sequence is received for five seconds, the answer to query STEP 623 is yes, then the routine proceeds to step 631 (FIG. 6C), which resets the loopback command timeout to 25 seconds. Upon, termination of tone C (the answer to query STEP 633 is yes), the routine proceeds to query STEP 635 to determine whether the next or fourth tone in the five tone sequence, tone B again, has been received for five seconds. If so, the routine executes the reset loopback command timeout in STEP 637 and proceeds to query STEP 641. Upon the termination of tone B, (the answer to STEP 641 is yes, the routine proceeds to STEP 651, to look for the presence of the fifth tone D. If tone D has been received for five seconds (the answer to STEP 651 is yes), the sequence proceeds to STEP 653, resetting the analog commanded loopback timer at twenty minutes and placing the unit in an analog commanded analog channel port commanded loopback mode. Tone D of the five tone channel loopback sequence is then maintained in memory until removed and the routine proceeds to STEP 662 (FIG. 6C), wherein a digitized 1014 Hz tone is transmitted to the far end of the loop. Once tone D is terminated (the answer to STEP 663 is yes), the loop returns to its normal data transmission status (STEP 665) and the routine returns to its starting location (STEP 601, FIG. 6A).

If the answer to query STEP 651 is no, the routine proceeds to query step 655, to determine whether or not tone C has not been received from the network for a period of five seconds. If the answer to query STEP 655 is no, query STEP 657 is executed to determine whether or not a twenty-five second loopback command timeout has been completed. If the answer to query STEP 655 is yes, or upon the completion of the loopback command timeout, the routine returns to the beginning at STEP 601 (FIG. 6A). Similarly, in the case of tone B, if the answer to query STEP 635 is no, there is a twenty-five second loopback command timeout (loop through query STEP 636) and the routine returns to the beginning.

Referring again to FIG. 6A, if the first tone in the sequence is not received (the answer to query STEP 601 is no), the routine proceeds to query STEP 671, in order to determine whether analog commanded loopback is in progress. If not, the routine returns to the beginning. If the answer to query STEP 671 is yes, the length of time of the analog commanded loopback is examined in query STEP 673. If twenty minutes has expired (the answer to STEP 673 is yes), STEP 675 is executed to clear any analog commanded loopbacks and the routine returns to STEP 601. If the answer to STEP 673 is no, query STEP inquires as to whether or not tone D has been received from the network for five seconds. If not (the answer to STEP 677 is no), the routine returns to STEP 601. If the answer to STEP 677 is yes, tone D is maintained in memory until removed and the routine proceeds to STEP 662 (FIG. 6C), wherein a digitized 1014 Hz tone is transmitted to the far end of the loop. Once tone D is terminated (the answer to STEP 663 is yes), the loop returns to its normal data transmission status (STEP 665) and the routine returns to its starting location (STEP 601, FIG. 6A), as described above.

If tone B is not received for five seconds in either the three tone (ACP loopback) sequence or the five tone (channel loopback) sequence, described above, the answer to STEP 611 is no. The routine then proceeds to query STEP 681 to determine whether UMC codes are being received from the network. If the answer to query STEP 683 is yes, a twenty-five second loopback command timeout is initiated (STEPS 683, 685). Upon completion of this timeout, the routine returns to STEP 601. Until completion of the timeout, it continues to monitor the link for tone B (return from query STEP 685 to STEP 611).

Testing of analog termination equipment, via a loopback path C at the analog port of the analog data station 15, is accomplished in a conventional manner by the test facility supplying a standard (2713 Hz loopback/command tone customarily used to test analog termination equipment. This encoded tone is not decoded by the micro-controller, but is passed on directly to the local analog termination equipment, which responds by providing a loopback path through its analog port.

REMOTE DIGITALLY SOURCED LOCAL LOOP TEST (FIG. 7)

Figure 7:
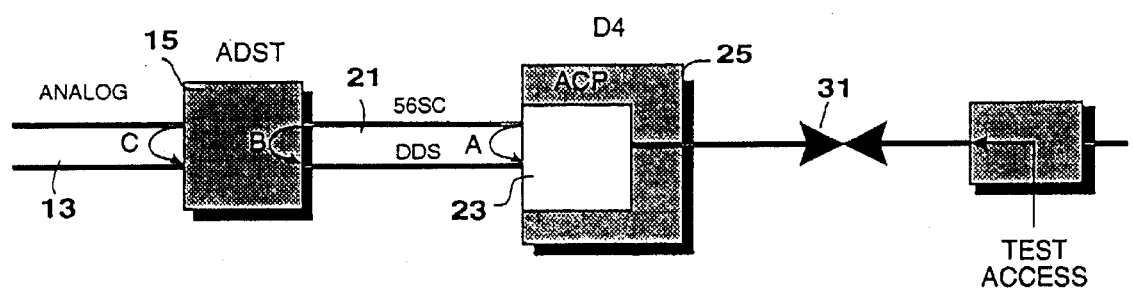
Figure 6:
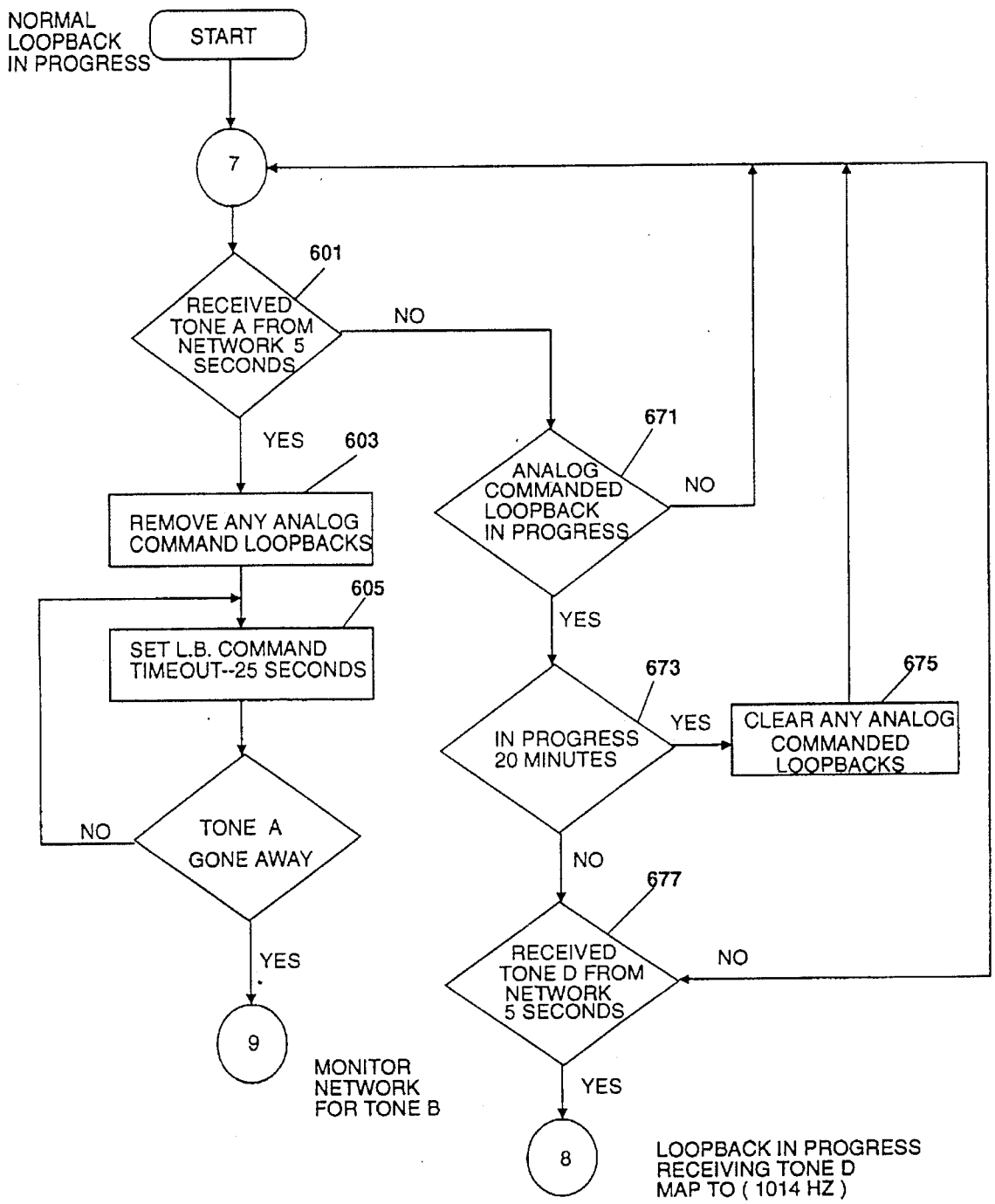
Figure 6B:
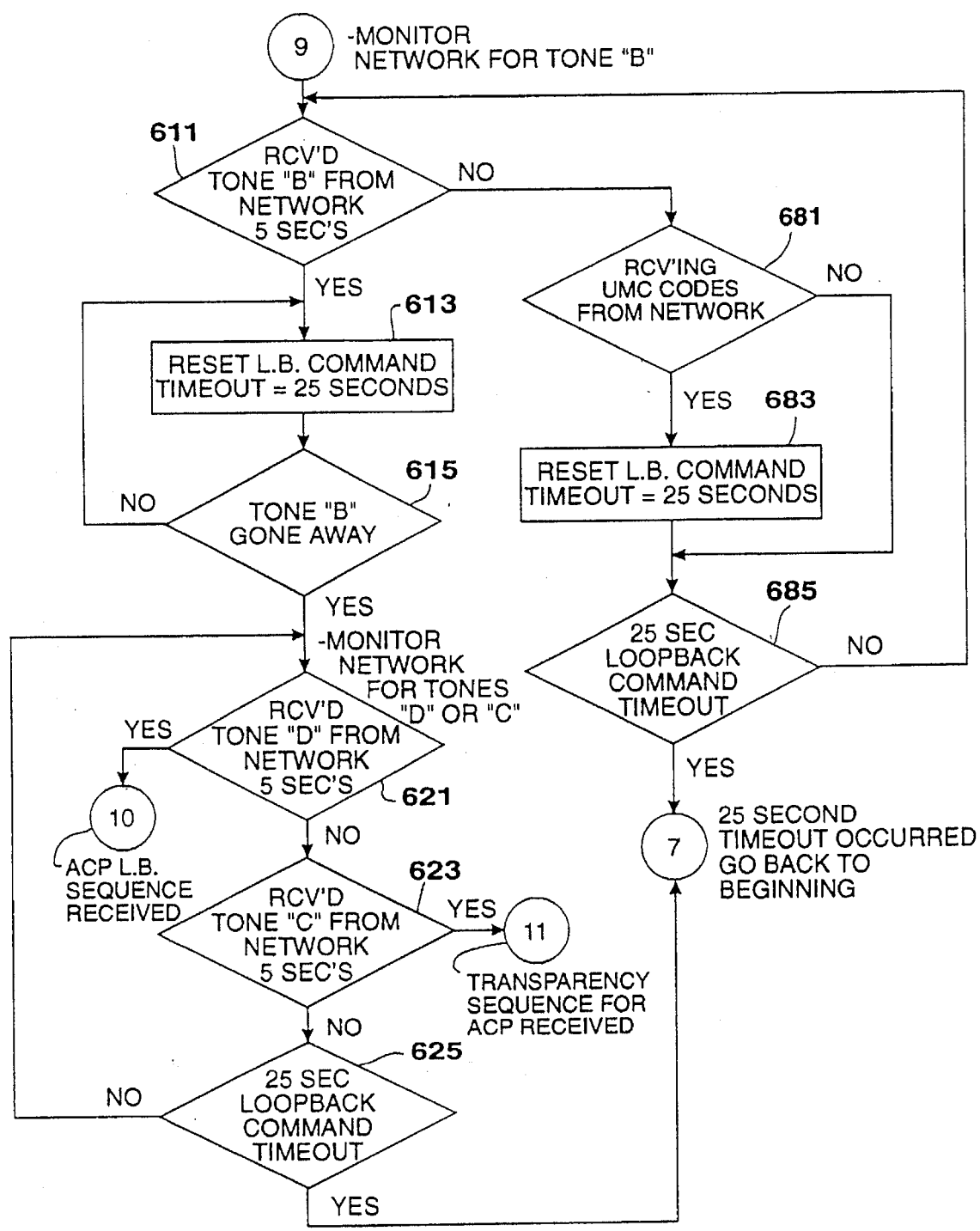
Figure 6C:
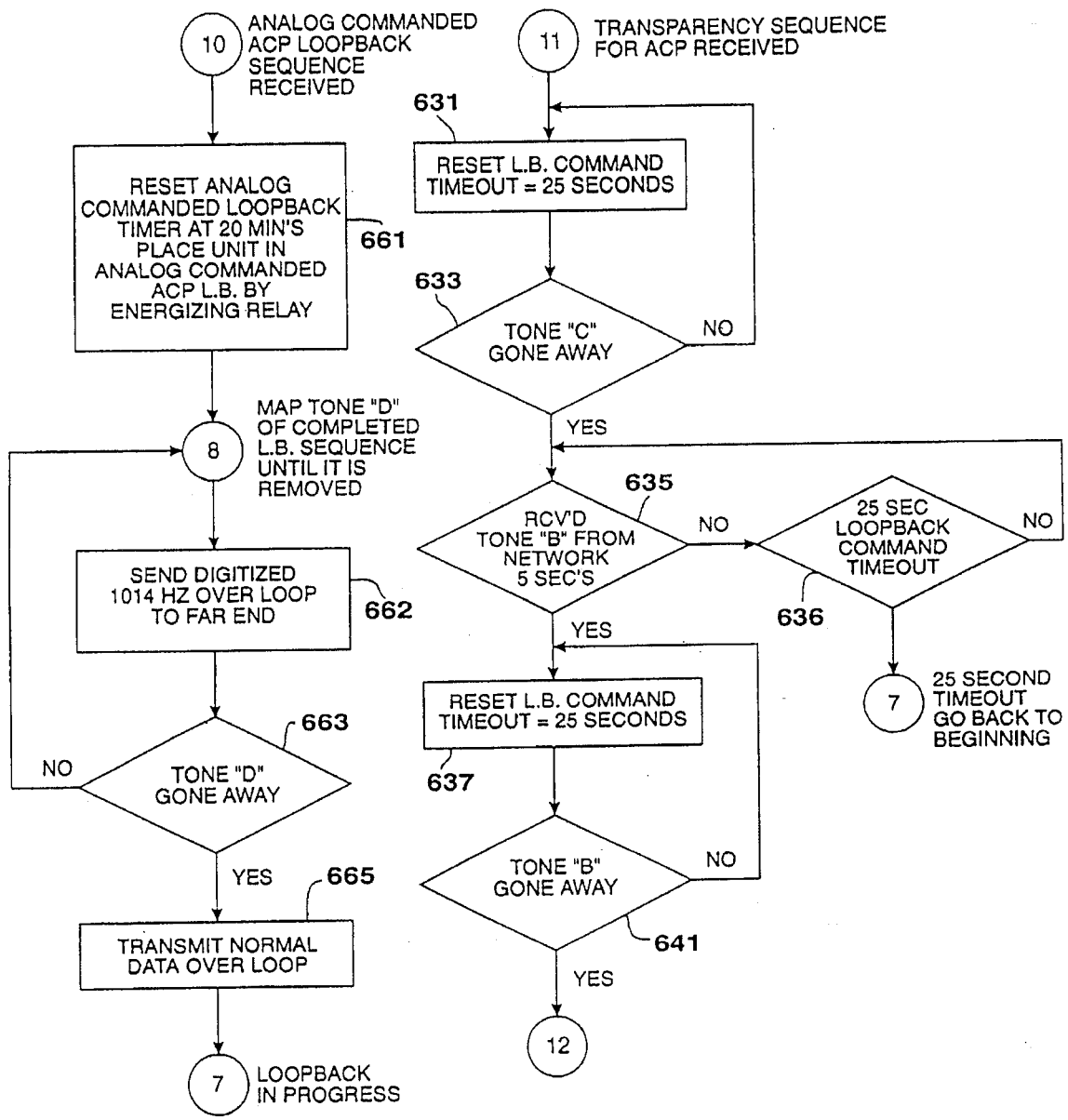
Figure 6D:
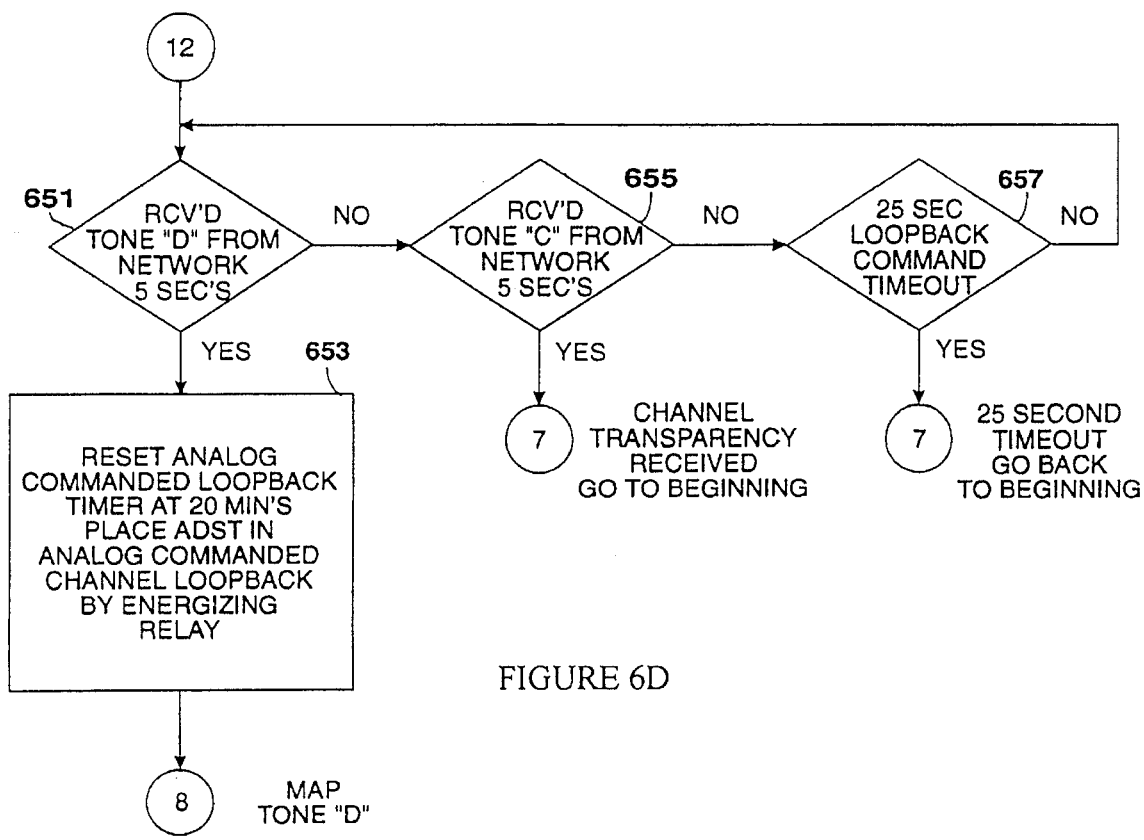

In addition, to the above described mechanism for testing, by way of an analog test facility, a communication link to which the office channel unit data port is connected, thereby augmenting the capability of a conventional OCU data port, the present invention retains the conventional test capability of responding to standard digitally sourced loopback test commands presently employed to test OCU data ports by way of a digital test facility, as by way of a DS1 interface in the T1 link, as diagrammatically illustrated in FIG. 7. Here, a remote servicing test facility supplies digitally formatted test signals for controlling the respective loopback paths A, B and C. This mode is similar to the test mode described above with reference to FIGS. 5, 5A, except that the test request data is originally in digital format, rather than being sourced as a sequence of tones from analog test tone equipment and digitally encoded by the remote OCU data port.

ANALOG CHANNEL-COMPATIBLE CONTROL CODES

In addition to the above-described incorporation of a test tone detector and an attendant modification of the microcontroller's control software for providing the capability of responding to test tones from an analog service facility, the analog service channel port in accordance with the present invention employs a set of control function codes that do not perturb an analog line, an unwanted effect that occurs as the result of converting digital code bytes currently employed by a conventional OCU data port into analog format for application to an analog channel.

Namely, as pointed out earlier, when directly converted into analog format for transmission over an analog channel, the particular digital code bytes employed for executing prescribed control functions (e.g. zero suppression, disable receiver, loss of signal) produce analog voltage levels which are substantially different from the signal level expected to be seen by the analog equipment, and effectively impart a disturbing 'glitch' to the analog line. In accordance with a further feature of the invention, this undesirable anomaly-introducing effect is effectively avoided by replacing such control code bytes with a different set of control function-defining code bytes the analog equivalent of which produce respective voltages that effectively correspond to voltage levels expected to be seen by an analog channel for the particular control functions.

A first control byte where this perturbation effect is particularly noticeable is the currently used zero-suppression code byte. A conventional OCU data port employs the code $98_{HEX}$ to implement the zero suppression function, through which one bits are inserted into an otherwise quiescent (all zeros) data stream at a repetition rate sufficient to prevent loss of channel. Since the control byte is normally employed within a purely digital environment, the choice of the HEX value employed to represent the control function is not particularly significant. However, if the office channel unit is employed in a hybrid network, for example one containing digital-analog interface equipment such as the analog data station described in the above-referenced Smith et al application, the resulting analog voltage produced by a D-A conversion of a control code having the value of $98_{HEX}$ is considerably different from the substantially large level expected to be seen by the analog channel where zero suppression is required.

To obviate this drawback, the analog channel compatible code modification scheme of the present invention replaces the conventional $98_{HEX}$ code by the code $02_{HEX}$. When converted into analog format, such a replacement or 'modified' code byte yields a voltage level that effectively corresponds to a zero suppression level, but still provides for the requisite repetitive insertion of one bits in the data stream to maintain synchronous operation of the digital channel. Namely, because the modified code contains a one bit in the next to least significant bit position, it not only provides for the requisite insertion of one bits into the data stream for effecting zero suppression, but it provides a relatively low digital value, the analog equivalent of which effectively corresponds to the signal level produced by an all zero byte.

It should be observed that the invention is not limited to this particular location of the one bit or the use of only a single one bit in the modified code. What is required is that the modified code both preserve the intended control function and effectively represent a signal level compatible with the analog channel. Thus, in the case of a zero suppression code, code byte values such as (but not limited to) $04_{HEX}$ or $06_{HEX}$, although producing slightly different analog voltage levels than the code $02_{HEX}$, would still be operative for effective zero suppression and be compatible with the analog channel signal levels.

Similarly, for representing a 'disable receiver' or 'loss of signal' function, the conventional code byte $9A_{HEX}$ used for this purpose is replaced in accordance with the present invention by the code byte $FE_{HEX}$. When converted into analog format for transmission over the analog channel, the code byte $FE_{HEX}$ yields a very low voltage level that effectively corresponds to what the analog channel expects to encounter for a loss of signal or idle condition. In addition, like the zero suppression code byte, it provides a zero in the LSB position, so as to conform with the accepted practice of permitting a zero to be used in the LSB position for control code purposes. Also, as in the case of the zero suppression code, it should be observed that the invention is not limited to only the specific code value $FE_{HEX}$ to represent the disable receiver function. The number of or location of the one and zero bits employed may vary as long as the resultant modified code preserves the intended control function and effectively represents the equivalent signal level expected to be seen by the analog channel. Thus, in the case of a disable receiver code, coda byte values such as $FC_{HEX}$ or $FA_{HEX}$, for example, although producing slightly different analog voltage levels, would still be acceptable.

As will be appreciated from the foregoing description, through the incorporation of a test tone detector and a modification of the micro-controller's control software, the present invention provides an analog service channel port that is capable of responding to test tones from an analog service facility. In addition, its control codes have values that do not introduce disturbing 'glitches' onto the analog line; instead when converted into analog format they produce respective voltages that effectively correspond to voltage levels expected to be seen by an analog channel, while conforming with the accepted practice Of permitting a zero to be used in the LSB position for control code purposes.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use in a communications network having a first communications channel over which digital communication signals are transmitted between first and second stations of said network, and a second communications channel over which digital communication signals are transmitted between said first station and a digital-analog interface station, said digital-analog interface station providing a digital-analog interface between said second digital communications channel and an analog communications channel to an analog signalling device, a method of controlling signalling operations within said network comprising the steps of:

(a) generating multi-bit digital codes representative of signalling operations to be performed; and (b) incorporating said multi-bit digital codes into digital communication signals conveyed over said second communications channel from said first station to said digital-analog interface station, so that respective bits of said multi-bit digital codes are conveyed over said second communications channel in a sequential format, so as to be successively adjacent to and immediately follow one another; and wherein said multi-bit digital codes have code values which, when converted into analog format by said digital-analog interface station for application to said analog communications channel, produce respective signal levels that effectively correspond to signal levels expected to be seen by said analog communications channel for the respective signalling operations represented by said multi-bit digital codes.

2. A method according to claim 11, wherein said multi-bit digital codes include a first multi-bit digital code for implementing a disable receiver function.

3. A method according to claim 2, wherein said first multi-bit digital code comprises an eight bit byte containing ones in the four most significant bit positions.

4. A method according to claim 2, wherein said first multi-bit digital code comprises the eight bit hexadecimal byte $FE_{HEX}$.

5. For use in a communications network having a first communications channel over which digital communication signals are transmitted between first and second stations of said network, a method of controlling signalling operations within said network comprising the steps of:

(a) generating multi-bit digital codes representative of signalling operations to be performed; and (b) incorporating said multi-bit digital codes into digital communication signals conveyed over said first communications channel from said first station to said second station, so that respective bits of said multi-bit digital codes are conveyed over said first communications channel in a sequential format, so as to be successively adjacent to and immediately follow one another; and wherein said multi-bit digital codes have code values which, when converted into analog format for application to an analog communications channel, produce respective signal levels that effectively correspond to signal levels expected to be seen by said analog communications channel for the respective signalling operations represented by said multi-bit digital codes.

6. A method according to claim 5, wherein said multi-bit digital codes include a multi-bit digital code for implementing a zero suppression function.

7. A method according to claim 6, wherein said multi-bit digital code comprises an eight bit byte containing zeros in the four most significant bit positions.

8. A method according to claim 6, wherein said multi-bit digital code comprises the eight bit hexadecimal byte $02_{HEX}$.

9. A method according to claim 5, wherein said multi-bit digital codes include a multi-bit digital code for implementing a loss of signal function.

10. The improvement according to claim 8, wherein said multi-bit digital code comprises the eight bit hexadecimal byte $FE_{HEX}$.

11. For use in a communications network having a first communications channel over which digital communication signals are transmitted between first and second stations of said network, and a second communications channel over which digital communication signals are transmitted between said first station and a digital-analog interface station, said digital-analog interface station providing a digital-analog interface between said second digital communications channel and an analog communications channel to an analog signalling device, and wherein signalling operations within said network are established by prescribed digital code bytes which are conveyed over said second communications channel from said first station to said digital-analog interface station, so that respective bits of said prescribed digital code bytes are conveyed over said second communications channel in a sequential format so as to be successively adjacent to and immediately follow one another, the improvement wherein said prescribed digital code bytes have code values which, when converted into analog format by said digital-analog interface station for application to said analog communications channel, produce respective signal levels that effectively correspond to signal levels expected to be seen by said analog communications channel for the respective signalling operations represented by said prescribed digital code bytes.

12. The improvement according to claim 11, wherein a first digital code byte of said prescribed digital code bytes comprises the eight bit hexadecimal byte $FE_{HEX}$ for implementing a disable receiver function.

13. For use in a communications network having a first communications channel over which digital communication signals are transmitted between first and second stations of said network, and wherein signalling operations within said network are established by prescribed digital code bytes which are conveyed over said first communications channel from said first station to said second station, so that respective bits of said prescribed digital code bytes are conveyed over said first communications channel in a sequential format, so as to be successively adjacent to and immediately follow one another, the improvement wherein said prescribed digital code bytes have code values which, when converted into analog format for application to an analog communications channel, produce respective signal levels that effectively correspond to signal levels expected to be seen by said analog communications channel for the respective signalling operations represented by said prescribed digital code bytes.

14. The improvement according to claim 13, wherein a digital code byte of said prescribed digital bytes comprises an eight bit hexadecimal byte $02_{HEX}$ for implementing a zero suppression function.

15. The improvement according to claim 11, wherein a first digital code byte of said prescribed digital code bytes comprises the eight bit hexadecimal byte $FE_{HEX}$ for implementing a loss of signal function.

* * * * *